G. S. RICE.
Music-Chart for Keyboard-Instruments.

No. 223,245. Patented Jan. 6, 1880.

Witnesses:
Louis Gosselin
Charles Sears

Inventor:
Gerrit S. Rice
D. Storer
Attorney

UNITED STATES PATENT OFFICE.

GERRET S. RICE, OF CHICAGO, ILLINOIS.

MUSIC-CHART FOR KEY-BOARD INSTRUMENTS.

SPECIFICATION forming part of Letters Patent No. 223,245, dated January 6, 1880.

Application filed November 16, 1878.

*To all whom it may concern:*

Be it known that I, GERRET S. RICE, of the city of Chicago, in the county of Cook, of the State of Illinois, have invented a new, useful, and improved device for use in combination with the key-board of a piano, organ, or any other kind of musical instrument provided with a key-board, for the purpose of indicating the harmonic chords and teaching thorough-bass in music.

The following is a specification of my invention, in which is clearly and fully described and set forth the construction of the device, its arrangement upon the key-board of the musical instrument, the manner of operating it, and the objects of its use in the study and practice of music for the purpose of enabling others to make and use the same.

Figure 1:
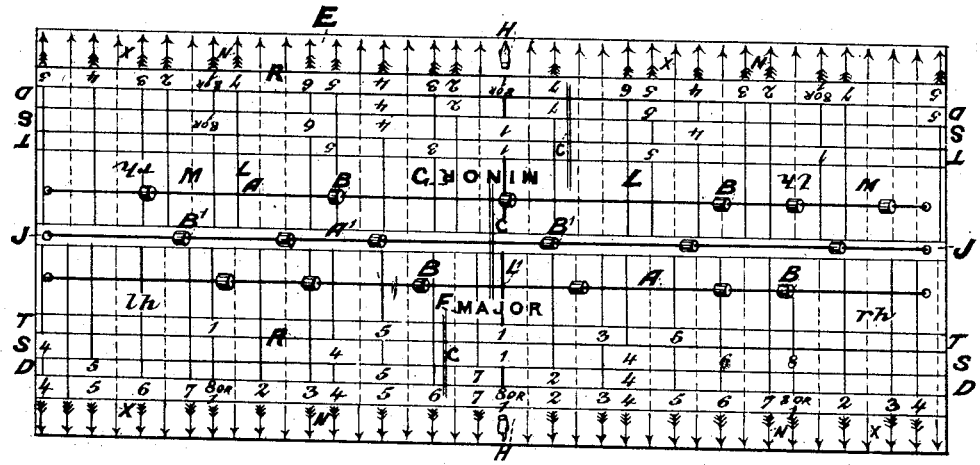
Figure 2:
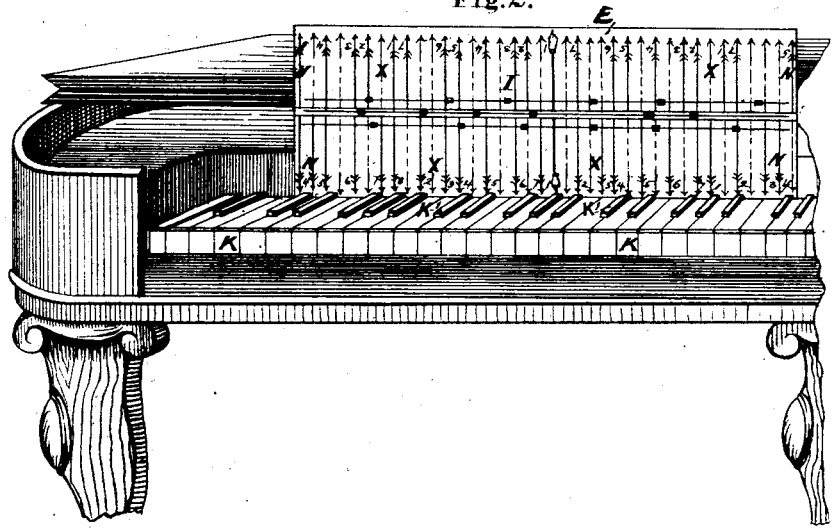

In the annexed drawings, which form a part of the specification, Figure 1 represents a plan view of my invention complete, and Fig. 2 a like view, but representing the device applied to the key-board of a piano.

Letters of like name and kind refer to like parts in each of the figures of the drawings.

My invention consists of a device composed of a thin flat plate or piece, E, of metal or any other suitable material, upon the flat surface of one side of which are arranged three sets or series, F, G, and J, of indicators of the harmonic chords in music, of which those of the series of F and G are imprinted or in any other suitable manner fixedly or immovably inscribed thereon or attached thereto, and those of J are movably arranged thereon. Those of F and G are arranged parallel to each other on opposite halves of the plate E, longitudinally divided, those of F, designated "major," representing the major keys, and those of G, designated "minor," the minor keys in music. Those of J are arranged between and parallel to those of F and G, occupying longitudinally the middle portion of the plate E, and representing both the major and the minor keys in music.

In my device the series of transverse lines L and M, terminating at each end, near the two side edges of the plate E, in darts N and X, indicate the keys K of the piano, organ, or other musical key-board instrument, the thick series L and darts N pointing to all the notes of the key in which the piece is to be played, indicated by the thick transverse line L' near the middle of the plate E, and terminating at each end in an index-hand, H, in like manner as the series terminating in the darts, and being always placed on the key-note of the piece of music to be operated, the lines M and darts X pointing to all the notes which may be accidentally introduced into the key.

The figures or digits occupying the spaces T, S, and D, formed by the longitudinal lines R in the series F, or major, and G, or minor, indicate the harmonic chords; those occupying the spaces T representing the tonic chords, those occupying the spaces S representing the subdominant chords, and those occupying the spaces D representing the dominant chords.

The short double transverse series C in the three series F, G, and J of indicators divide the notes in the key indicated by the key-note indicator H which are performed by the right hand from those performed by the left hand, the letters *r h* between the series F and J and G and J indicating the notes in the key performed by the right hand, and the letters *l h* those performed by the left hand.

The series J consists of three wires or strings, A and A', which extend longitudinally from one end of the plate E to the other, to which the wires are at each end, respectively, in any suitable manner attached, upon each of which wires are sprung a series of any required number of clamps, B and B', of india-rubber or any other suitable material of any desired shape and size, the clamps B being mounted upon the wires A and the clamps B' upon the wire A'. The clamps upon each of the wires are movable for the purpose of adjusting them to the keys of the musical instrument as may be required for indicating the harmonic chords. The clamps B' upon wire A', being between the clamps B and wires A, represent the subdominant chords in all the keys of music, and the clamps B upon wires A represent alternately the tonic and dominant chords, according as the key to which the device is set be the major or minor, the series J being applicable to both the major and minor keys in all their derivations, inversions, variations, and positions.

The device is so constructed that in using it upon a piano, P, or organ, or other musical instrument having a key-board, it is placed upon one of its side edges upon the keys K, behind the raised keys K', in which position it may be pendent from or lean against the perpendicular portion of the instrument P, and is movable upon the key-board for the purpose of adjusting it to any desired key by placing the indicator H upon the key-note of the piece of music to be performed.

The object of my invention is to provide a device that shall be available for use by the novice as well as the amateur and the proficient in the science and art of music.

In the device the series F and G (the series F indicating the major chords and the series G the minor chords) are especially intended for the use of the novice. The indicating figures or digits in each of the chords thereof, being fixed or immovable, point unerringly to the harmonic notes or sounds in each of the chords in the major and minor keys to the key-note of which the key-note indicator H is set.

The series J is intended for the use of those who are more or less advanced in the science and art of music, the indicating-clamps B and B' being movable and adjustable to every and any possible derivation, inversion, variation, and position in each and every key in music to the key-note of which the key-note indicator H may be set in the major and minor keys.

In setting the device to a major key the edge of the device nearest the series F, or major, must be placed on the key-board, and in setting it to a minor key the edge of the device nearest the series G, or minor, must be placed on the key-board.

The transverse line L' and index-hand H indicate the key-note for each of the series F, G, and J, respectively, on placing said indicator H on the key-note of the piece of music to be performed, and the transverse lines L and M and darts N and X indicate all the notes in the key to which said indicator H may be set for each of said series F, G, and J, respectively.

In the foregoing specification I have described and shown certain particular series of characters and figures inscribed and arranged on said plate, for the purpose of indicating the harmonic chords in music and teaching thorough-bass; but it is apparent that lines, figures, and characters, or objects of any other kind or shape, arranged in like order in relation to each other, would serve a like purpose as those described and shown. Therefore I do not intend to limit my invention to any particular form of figures or objects employed, but will claim any and all figures, characters, or objects suitably employed in such order, arrangement, and relation to each other and to the keys of the piano, organ, or other musical instrument, for the purposes set forth.

Having thus described my invention, what I claim as new, and desire to secure by Letters Patent, is—

1. A device for use on the key-board of musical instruments for indicating the harmonic chords and teaching thorough-bass in music in the major key, consisting of the chart or plate E, having a fixed vertical key-note indicator, L' H, and note-indicators L N and M X, and three rows of figures between the horizontal lines R, the upper row, T, indicating the harmonic sounds of the tonic chord, the middle row, S, indicating the harmonic sounds of the subdominant chord, and the lower row, D, indicating the harmonic sounds in the dominant chord, arranged in relation to each other under the word "major" on one half of the board or plate E, substantially as described, for the purposes set forth.

2. A device for use on the key-board of musical instruments for indicating the harmonic chords and teaching thorough-bass in music in the minor key, consisting of the chart or plate E, having a fixed vertical key-note indicator, L' H, and note-indicators L N and M X, and three rows of figures between the horizontal lines R, the upper row, T, indicating the harmonic sounds of the tonic chord, the middle row, S, indicating the harmonic sounds of the subdominant chord, and the lower row, D, indicating the harmonic sounds of the dominant chord, arranged in relation to each other under the word "minor" on the other half of the board or plate E, substantially as described, for the purposes set forth.

3. A device for use on the key-board of musical instruments for indicating the harmonic chords and teaching thorough-bass in music, consisting of a chart or plate provided with the key-note indicator L' H, and note-indicators L N and M X, and the movable clamps B and B', wires A and A', arranged upon the middle belt of the plate E between the words "major" and "minor," substantially as described and shown, for the purposes set forth.

In witness whereof I hereunto subscribe my name this 23d day of October, 1878.

GERRET S. RICE.

Witnesses:
DANIEL STONER,
L. H. FREIBERGER.